United States Patent [19]

Eichelberger

[11] Patent Number: 4,616,263

[45] Date of Patent: Oct. 7, 1986

[54] VIDEO SUBSYSTEM FOR A HYBRID VIDEOTEX FACILITY

[75] Inventor: George P. Eichelberger, Fairfield, Conn.

[73] Assignee: GTE Corporation, Stamford, Conn.

[21] Appl. No.: 700,424

[22] Filed: Feb. 11, 1985

[51] Int. Cl.⁴ ............................................. H04N 5/222
[52] U.S. Cl. ....................................... 358/185; 358/342
[58] Field of Search ................... 358/12, 23, 141, 181, 358/185, 186, 335, 342, 344, 345

[56] References Cited

U.S. PATENT DOCUMENTS

| | | | |
|---|---|---|---|
| 3,506,965 | 4/1970 | Dowling | 358/185 |
| 3,627,914 | 12/1971 | Davies | 358/185 |
| 3,894,177 | 7/1975 | Howell | 358/185 |
| 4,271,430 | 6/1981 | O'Brien | 358/181 |

*Primary Examiner*—Tommy P. Chin
*Attorney, Agent, or Firm*—John A. Odozynski; Peter Yiarhos

[57] ABSTRACT

A video subsystem for a hybrid teletex facility includes a computer-based video control unit coupled to a general purpose interface bus, such as the IEEE 488, capable of parallel data transfer at the requisite rate. Appended from the bus are a plurality of microprocessor-based video cluster controllers for supervising the retrieval of selected video segments from randomly accessible storage media, i.e., video discs. The selected video segments are frequency translated through associated video modulators and thereafter coupled, under supervision of the video controller, through a video switch to selected broadcast frequency modulators. The outputs of the broadcast modulators are arranged by a video combiner into a composite NTSC video signal suitable for transmission or, for example, a CATV system.

1 Claim, 2 Drawing Figures

VIDEO SUBSYSTEM FOR A HYBRID VIDEOTEX FACILITY

TECHNICAL FIELD

The invention relates to a hybrid videotex facility that utilizes CATV or similar broadband facilities for the downstream transfer of full motion video, photographic stills and audio segments and utilizes telephone facilities for the bidirectional transfer of information between an information provider and an information user. More particularly the invention is directed to a video subsystem including a control unit coupled to an interface bus and a plurality of cluster controllers appended from the bus. The subsystem also includes modulators, a video switch and combiners for synthesizing a composite signal.

BACKGROUND OF THE INVENTION

A videotex system may be generally described as an interactive, graphics-based communications system in which information may be selected by an information user through a telephone connection to an information provider. The selected information may be delivered through the use of a number of transmission media such as cable television (CATV), optical fiber, direct broadcast satellite (DBS) or low data rate transmission over the public telephone network.

The subject invention represents an enhancement over existing videotex systems in that it provides the user with information of a markedly improved video quality.

SUMMARY OF THE INVENTION

The invention is a video subsystem that includes a video control unit for determining the storage location of video segments and for scheduling broadcast times for various segments. The control unit is coupled to a general purpose interface bus from which are appended a plurality of cluster controllers, the cluster controllers in turn coupled to a plurality of randomly accessible video storage units for supervising the retrieval of selected video segments.

Selected video segments are coupled to first level modulators and therefrom to a video switch which operates under direction from the control unit. The outputs of the switch are coupled to a plurality of second-level modulators and therefrom to a combiner for synthesizing a composite signal suitable for transmission to users via, for example, a CATV system.

DETAILED DESCRIPTION OF THE INVENTION

Figure 1:
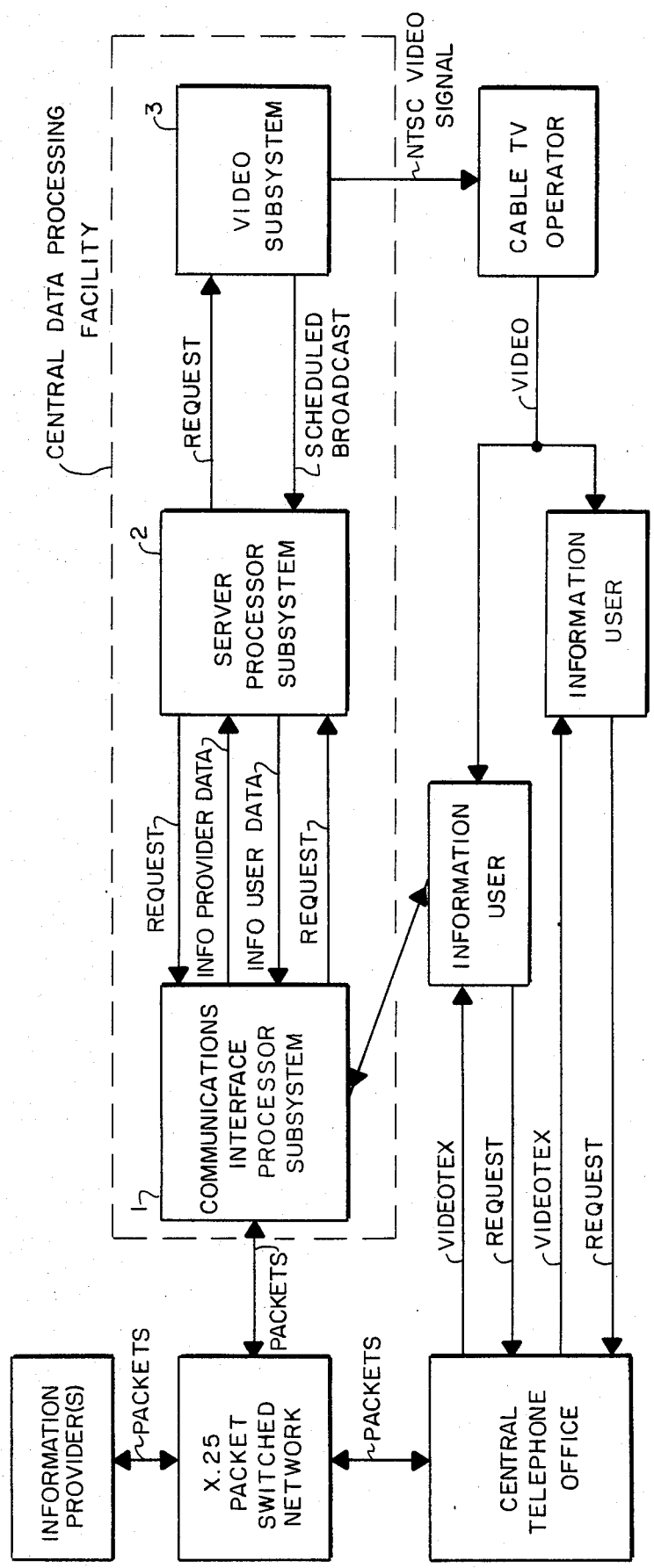
FIG. 1 is a block diagram of a hybrid videotex facility.

Referring now to the drawing, it can be seen that the means by which videotex and full motion video is delivered to the business, residential, or public access information user is controlled by a central data processing facility. This facility is responsible for coordinating all requests for data or video from the information users. Should the requested videotex data not reside locally, the central facility has the capability to set up a connection from the user to the appropriate information provider through the packet switched network. This "gatewaying" process allows at least some portion of the data which particular users might require to be stored remotely from the central facility. The information providers also have the option to store and update their own data at the central facility's data base.

The central data processing facility can be functionally divided into three distinct subsystems, a communications interface processor subsystem 1, a server processor subsystem 2, and a video subsystem 3.

The communications interface processor is adapted to be coupled between the information providers and the information users so as to control the transfer of all data between the facility and either the information provider or information user. In addition, the interface processor is adapted to be coupled to the packet switched network so that communications can be effected either directly via a dedicated connection or indirectly using the packet switched network and the public telephone netowrk.

The communications interface processor consists of one or more digital computers with the appropriate hardware and software to handle the disparate communications protocols that are used in the data transmissions. It presents the information provider's data and information user's request for data to the server processor subsystem in a consistent format. It receives from the server processor videotex data to be sent to the information user and receives requests for gateway connections to be sent to the information provider.

The server processor subsystem is coupled between the interface processor and server processor subsystems and represents the keystone of the hybrid network. It is responsible for providing the user the information that he or she requested and for storing data received from an information provider. The data requested by a user may be stored locally or may reside at an information provider's remote data base. In the latter case a gateway connection between the user and the remote data base is made. The enhanced information, i.e. photographic stills, audio, and full motion video segments, are stored at the video subsystem and are scheduled for broadcast upon request. The server processor also provides for the coordination and control of the information provider's and information user's sessions, recording such details as length of session, amount of data accessed, and billing information. It may consist of one or more digital computers along with the necessary storage facilities.

The video subsystem is coupled to the server processor subsystem and may be linked to one of a number of transmission media such as the CATV system depicted in FIG. 1. The video subsystem is responsible for presenting enhanced videotex information to the user. This enhanced information may be photographic stills, audio, or full motion video segments. Upon request from the server processor, this subsystem will retrieve the information from its storage facility, inject it into the appropriate channel and time slot, and send it to the cable TV operator for broadcast over a coaxial cable to the information user. It also notifies the user via the server processor when the segment will be broadcasted. In general, subsystem comprises a digital computer, several video storage units, and all of the switching, multiplexing, and transmission equipment necessary to deliver video information to the cable TV operator for broadcast.

Figure 2:
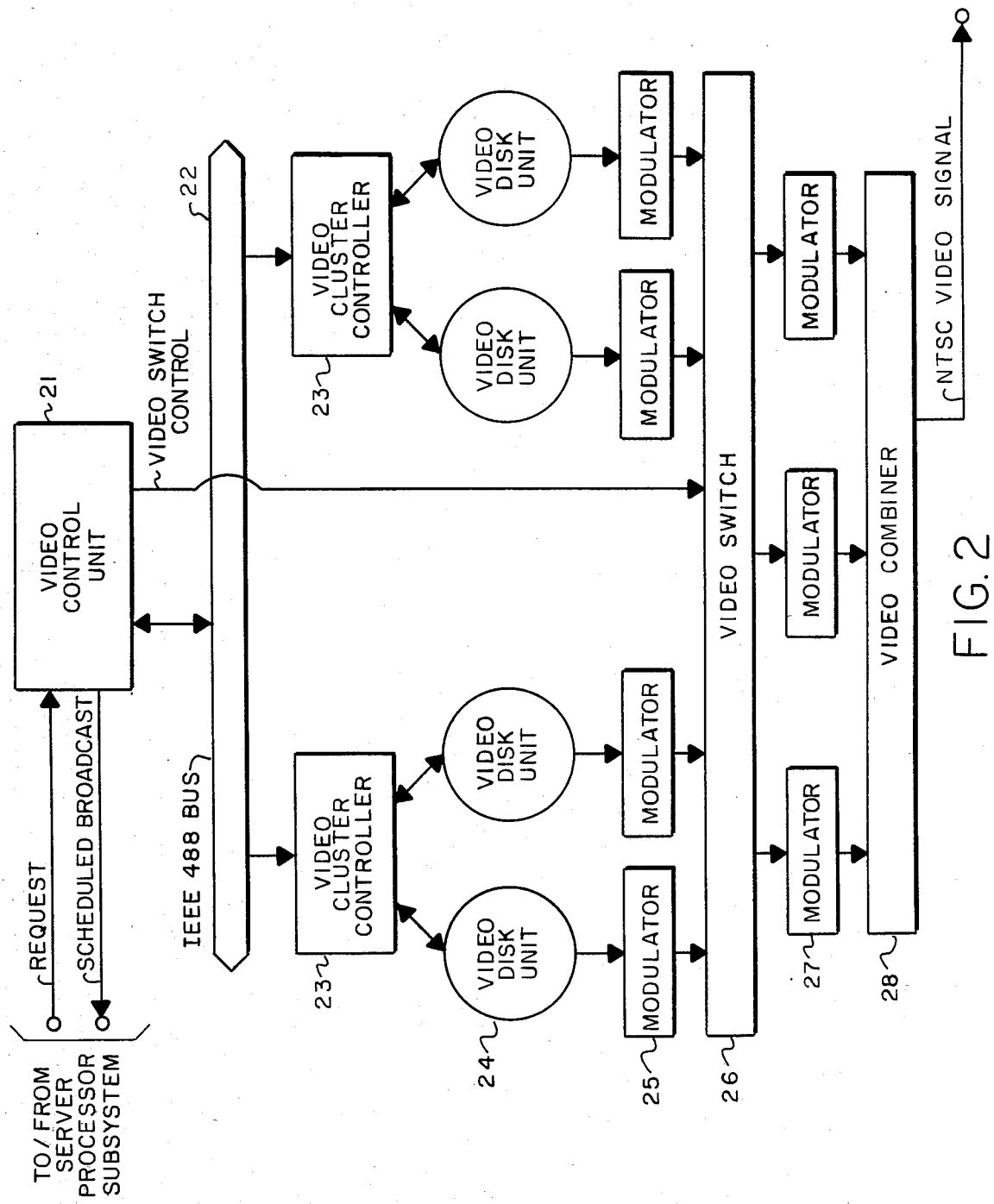
FIG. 2 is a detailed block diagram of the subject video subsystem.

Referring with particularity to FIG. 2, the video subsystem is seen to include a video control unit 21 that includes a computer to determine the storage location of various video segments, to activate one of plurality of video cluster controllers 23 and to program a video switch 26. The video control unit is coupled to a general purpose interface bus 22, such as the IEEE 488 BUS, capable of parallel data transfer at requisite data rate.

Appended from the parallel bus are a plurality of video cluster controllers 23 for implementing the retrieval of selected video segments as directed by the control unit. The video segments may be stored on a plurality of mass storage units, depicted as video disks 24 in FIG. 2. Selected video segments are coupled to one of a plurality of video modulators 25 and the outputs of the modulators coupled to a video switch 26. The video modulators translate the selected baseband signals to a frequency compatible with the characteristics of the video switch. The video switch in turn determines, under control of the video control unit 21, the mapping of particular video segments to one of a plurality of RF modulators 27. The modulators translate the video frequency signals to a broadcast channel frequency. The broadcast channels are merged into a composite signal in a video combiner 28. The output of the video combiner is ultimately coupled in the CATV operator depicted in FIG. 1.

Collaterally, although the following elements are not per se a part of the invention, an understanding of their operation and function is considered helpful in the appreciation of the invention. Specifically, the information providers are responsible for providing videotex data to the information user. This data is either transferred directly to the user during a gateway connection or is periodically transferred to the central data processing facility for storage. The information providers interface to the hybrid network via the packet switched network or via a direct connection if the volume of data transferred warrants it.

The packet switched network is used to transfer information among the information user, the information provider, and the central data processing facility. Data is transmitted via packets using the X.25 protocol. The system may use a public network or a privately installed and maintained network which only supports the hybrid system.

The central telephone office provides access to the information user via the local loop. It interfaces to the X.25 packet switched network, converts the packet data to analog tip and ring signals, and transmits the data to the information user. It also performs similar operations for data transfers in the opposite direction. The technology used to transmit and receive data over the local loop may be Data Over Voice (DDV), Alternate Voice Data (AVD), or Simultaneous Data and Voice (SDV).

The information user is the end recipient of videotex data and full motion video segments. His terminal, be it a dedicated device like a personal computer or a television set with a special decoder box, will interface to the telephone network and the CATV network. Connection to the hybrid network must first be set up over the telephone link and then a videotex session can take place. During the session, a full motion video segment may be requested via the telephone data connection. A data message will be returned to the terminal dictating the time and channel of the segment broadcast. The terminal will force tune its CATV receiver to that channel at the appropriate time and receive the requested broadcast. When the user is not using the videotex service, the hybrid network will not interfere with his normal telephone and CATV service.

What is claimed is:

1. A video subsystem for a hybrid videotex system, the video subsystem comprising:
    a general purpose interface bus capable of parallel data transfer at a requisite data rate,
    a computer-based video control unit coupled to the bus for determining the storage location of video segments and for scheduling video segments to be broadcast,
    a plurality of randomly accessible video storage units,
    a plurality of microprocessor-based video cluster controllers appended from the bus and coupled to specified ones of the video storage units for supervising the retrieval of selected video segments from said video storage units,
    a plurality of first modulators coupled to a respective one of the video storage units for frequency translating the selected video segments,
    a video switch coupled to the video control unit and to the outputs of said first modulators for selecting, under direction from the video control unit, said frequency-translated video segments,
    a plurality of second modulators coupled to the video switch for raising the selected and frequency-translated video segments, and
    a video combiner for arranging the output signals at the second modulators into a composite signal suitable for transmission via, for example, a CATV system.

* * * * *